Figure 4:
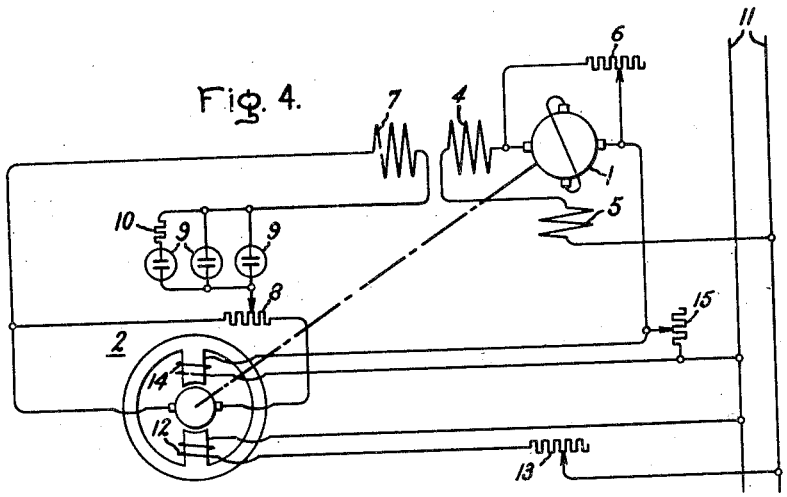

Sept. 6, 1949.  R. D. JONES ET AL  2,481,311
REGULATED SPEED MOTOR SYSTEM
Filed Jan. 10, 1947  2 Sheets-Sheet 1
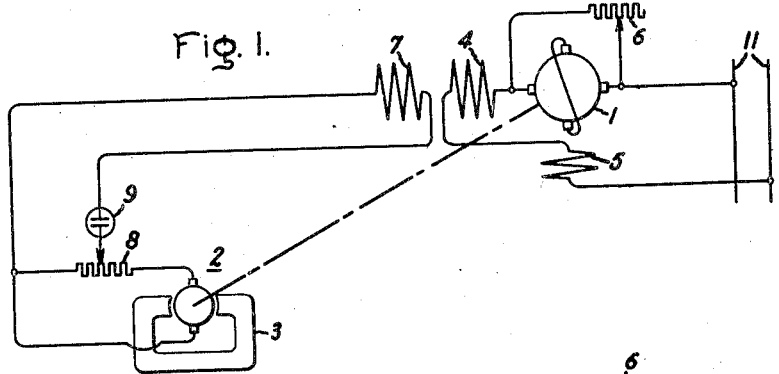
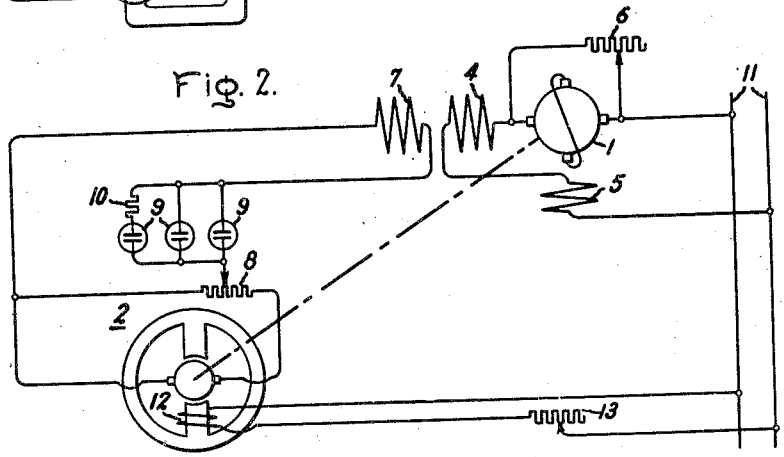
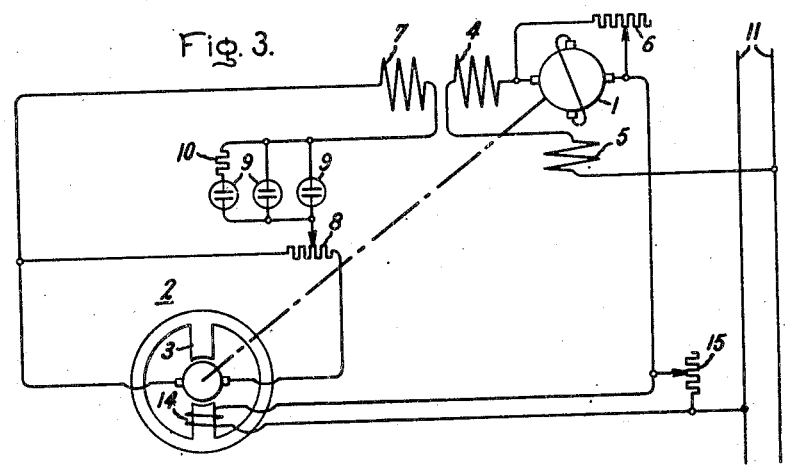
Inventors:
Ray D. Jones,
Frank W. Merrill,
by *Browell S. Mack*
Their Attorney.

Inventors:
Ray D. Jones,
Frank W. Merrill,
by Prowell & Mack
Their Attorney.

Patented Sept. 6, 1949

2,481,311

UNITED STATES PATENT OFFICE 2,481,311

REGULATED SPEED MOTOR SYSTEM

Ray D. Jones and Frank W. Merrill, Fort Wayne, Ind., assignors to General Electric Company, a corporation of New York Application January 10, 1947, Serial No. 721,204

15 Claims. (Cl. 318—308)

Our invention relates to speed regulation devices for motors wherein the speed is kept constant for varying conditions of load and line voltage.

In many applications for motors, it is desirable to provide a motor which will operate at substantially constant speed under varying conditions of line voltage and load. Numerous arrangements have been utilized for this purpose, including various devices incorporating a tachometer-type generator driven by the motor, the voltage output of which is used to excite a speed controlling field winding of the motor. This excitation is usually arranged to increase the field flux of the motor on increase of speed, and conversely to decrease the flux on decrease of speed, thereby tending to keep the speed of the motor constant.

It is an object of our invention to provide a simple electrical device which will allow the motor to pick up speed to a predetermined amount and thereafter maintain the speed at that level under varying conditions of line voltage and load.

Another object of our invention is to provide a device for maintaining the speed of a motor constant with a high degree of precision over a wide range of line voltage and load.

In one of its aspects, this invention comprises a gaseous discharge glow tube, associated with the output of a tachometer generator or the like, so that the tube is nonconducting and the speed controlling field winding of the motor is not energized until the motor has come up to a predetermined speed, at which point, the tube fires and the field winding is energized by the difference between the voltage output of the tachometer generator and the voltage drop in the tube.

Further objects and advantages of our invention will become apparent and our invention will be better understood from the following description referring to the accompanying drawings, and the features of novelty which characterize our invention will be pointed out with particularity in the claims annexed to and forming part of this specification.

In the drawings, Figs. 1 through 5 illustrate five embodiments of our invention utilizing a tachometer generator driven by a direct-current motor to excite a speed-regulating field of the motor including a gaseous discharge tube to allow the motor to come up to speed before the field is energized and to regulate it closely to the desired speed for changes of load and line voltage.

Referring now to Fig. 1, we have shown a direct-current motor 1 driving auxiliary tachometer generator 2 which is excited by a permanent magnet field 3, or which may be excited by any other source of constant magnetization. While we have shown an amplidyne-type motor with compensating winding 4, a series starting winding 5, and compensating resistance 6, it is understood that any direct-current motor can be employed. Motor 1, which has its armature connected to any suitable source of direct-current potential 11, has a field winding 7 which is so arranged that it aids the excitation flux in the case of a conventional direct-current motor, or provides cumulative control flux in the case of an amplidyne-type motor as shown. Thus, it will be seen that when the current flowing in field winding 7 increases so as to add to the net excitation or control flux, the motor will slow down, and a reduction in the current flow will produce a corresponding increase in speed due to reduction of the net field flux of the motor.

We have arranged motor field winding 7 for excitation from the armature of tachometer generator 2. In the type of generator we have used, the voltage characteristic is substantially proportionate to the speed, and thus the current flowing in the motor field winding will be increased with an increase in the speed of the motor, thus increasing the net motor field flux and tending to reduce the motor speed. Conversely, the reduction of the motor speed will be reflected in a reduction of current in the motor field winding with a corresponding reduction in the net motor field flux, thus producing a tendency to increase the motor speed.

As the system has been so far described, this regulating operation would take place as soon as the motor starts from standstill, thus providing a rather slow motor acceleration and a broad speed regulating range under conditions of varying voltage and load, since there is only a linear change of excitation with speed. Consideration of the circuit described will show that each increment of speed increase would result in a corresponding increase in current in field winding 7 and net motor field flux.

In order to allow the motor to accelerate rapidly to the desired speed and to obtain regulation within close limits at this speed under conditions of varying load and voltage, we have provided the arrangement now to be described whereby the field winding is not excited by the tachometer generator 2 until a predetermined speed which is desired to be held relatively constant is reached, at which point it is excited, resulting in very rapid changes in net excitation with small increments or decrements of speed. To provide this sequence of operation, we have utilized an arrangement which includes a potentiometer 8 across the armature terminals of generator 2. Motor field winding 7 is connected across one terminal of the generator and the sliding contact of the potentiometer. Connected in series with the field winding, we have provided a gas-filled discharge tube 9 of the type having a critical minimum voltage of ionization and a counterconductive voltage substantially independent of speed, i. e., a tube having a definite discharge voltage and a substantially constant terminal voltage after discharge. The counterconductive voltage of a gaseous discharge tube is the voltage drop in the tube after the tube has fired. This voltage is opposite in polarity to the voltage impressed on the tube. For the tube 9 we have used conventional neon glow tubes such as R. C. A. Voltage Regulator Tube Type 991, but have found an argon-filled tube, R. C. A. Voltage Regulator Tube Type VR 150/30, to be more satisfactory for this purpose since it has a flatter characteristic between milliamperes and voltage and thus provides better regulation. It can now be readily understood that the tube 9 acts as a valve since it offers practically infinite resistance to current flow below the breakdown voltage. Immediately after breakdown, the tube resistance is still high on an absolute scale, but decreases substantially in a linear manner with increase of current from that point on throughout its working range. For example, one of the tubes used has a drop of 150 volts at 5 milliamperes after breakdown (30,000 ohms) and a drop of 152 volts at 30 milliamperes, the maximum working current allowed (about 5,000 ohms). The tube drop is, therefore, substantially constant for a range of current in the motor control field of 6 to 1. Since the conductive voltage drop of the tube is opposed to the voltage produced by the generator, motor field 7 will be excited only by the difference in the counterconductive voltage of the tube and the generator voltage. Thus a small increase in speed of the motor with the attendant small increase in voltage of the generator produces a sharp change in current in the motor field 7. This sharp change of current with very little change of voltage is the reason for the close speed regulation effected. Along with this, the resistance of motor field 7 must be kept small with reference to the minimum impedance of the tube. Otherwise, it would require substantial additional voltage from the tachometer generator materially to increase the current through field 7, which would result in inaccuracy in speed regulation. Thus, while the motor is coming up to speed and before the breakdown voltage of the tube is produced by the generator, only infinitesimal current will flow in motor field winding 7. However, when the motor reaches a speed at which the generator produces the breakdown voltage of the tube, the tube will fire, thus energizing the motor field winding 7 with only a small further increment of speed and thus initiating the speed-control operation described above. The provision of potentiometer 8 allows for adjustment of the speed at which the tube fires and starts the speed control operation, since the voltage equal to the ionization voltage of the tube can be selected on the potentiometer and when the generator has reached a speed which produces this voltage across the section of the potentiometer utilized, the tube will fire. Thus a positive adjustment of the speed which it is desired to hold constant is provided.

Also, if speed adjustment is not necessary, the potentiometer 8 may be omitted and a desired speed set by the proper selection of the tube and tachometer generator voltage.

In order to provide a safety feature to prevent the failure of a single tube from rendering the entire circuit inoperative, we have provided in an alternative embodiment of our invention a plurality of parallel-connected tubes 9, as shown in Fig. 2. Since the characteristic of each tube is inherently slightly different, the tube with the lowest internal resistance will fire first, the remaining tubes being inoperative. In the event of a failure of the operating tube, the tube with the next lowest resistance will automatically fire with an attendant slight increase in speed of the motor. In order further to provide an alarm or an indication of the failure of these tubes, we have provided a resistance 10 in series with one of the tubes. This resistance will insure that its associated tube will always fire last. The glow of this tube may itself serve as an indication of the necessity of replacing the other tubes, or the series resistance can be in the form of a current-operated relay to operate an alarm.

In the embodiment shown in Fig. 1 there is necessarily still some change of speed with change in load or line voltage. Since the voltage regulation of the discharge tube, for change of current, is close but not zero, some change in voltage and hence speed of the tachometer generator is required to produce the change in current through the discharge tube and field 7 to compensate for a change in load or line voltage. This required speed change can be partially or wholly compensated for if the change in line voltage or load current of the motor to be controlled changes the voltage of the tachometer generator independent of speed change.

To permit the generator to respond to changes in line voltage before it actually results in a change in speed of the motor, we have provided the embodiment of this invention shown in Fig. 2 whereby a change in line voltage will compound the tachometer generator to change the voltage output independent of the speed change. Here a low-ampere turn shunt or voltage coil 12 is placed around one of the poles. A preferred construction is to have one permanent magnet pole and one soft steel pole (a two pole generator) with coil 12 wound around the soft steel pole. This field winding is excited from the variable motor line voltage 11 and variable resistance 13 is provided to permit adjustment for proper current flow in the field winding 12. It can be seen that whenever there is a tendency for the speed of the motor 1 to increase because of a change in the voltage of the line 11, it will not be necessary for the tachometer generator actually to change speed in order to change the excitation on motor field winding 7.

Fig. 3 illustrates another embodiment of our invention in which coil 14 is placed around one of the poles of generator 2 in a manner similar to that described for the embodiment shown in Fig. 2. This coil is placed in series with main brushes of generator 1 and is, therefore, excited by the motor armature current. Resistor 15 is provided across generator field winding 14 to provide for the proper value of current flow in the winding. It will be seen that a change in the load current of motor 1 accompanying a change of load will compound the tachometer generator to change the voltage independently of the resultant speed change. Thus, it is apparent that it will be unnecessary for the tachometer generator to change speed with a change in load on the motor in order to increase or decrease the excitation of motor field 7 to keep the speed constant.

In Fig. 4, we have shown an embodiment arranged so that either a change in voltage or a change in load, or a simultaneous change in both line voltage and load, will cause a change in the voltage output of the tachometer generator independent of a change in speed to compensate for the change of load and/or line voltage. Here generator field winding 12 is excited from the line voltage in the manner covered by the description accompanying Fig. 2, and generator field winding 14 is excited from the armature current of motor 1 in the manner covered by the description accompanying Fig. 3. It will be seen that simultaneous changes in load and line voltages in such a direction as to produce opposite effects will compensate in the tachometer generator, and a net change in voltage of the tachometer generator will result in the proper direction.

Figure 5:
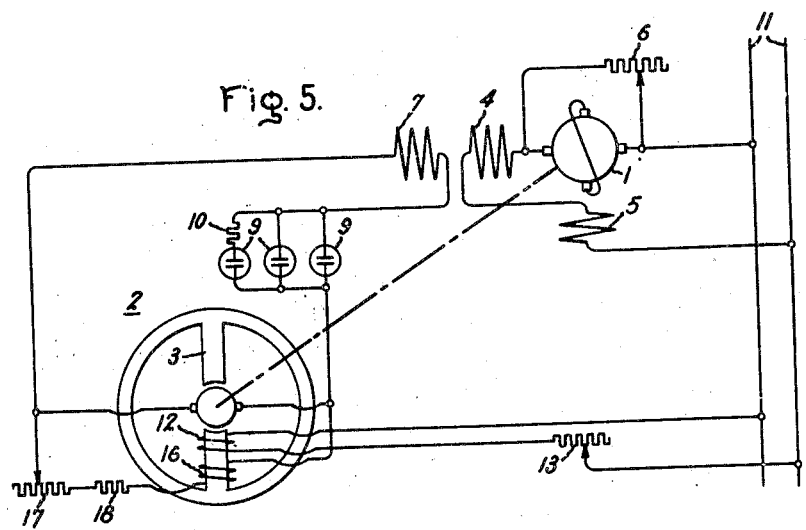

Fig. 5 illustrates a further embodiment of our invention incorporating an additional generator field winding 16 connected across the armature of generator 2 to compensate for variations in the permanent magnet and tubes. The current in this winding is adjusted by variable resistor 17 and a negative current characteristic resistor 18 prevents variations in resistance due to high current flow. This arrangement permits adjustment of the voltage output of generator 2, thus providing an adjustment for the speed at which the tubes will fire, obviating the necessity for the potentiometer 8.

To summarize, it can be seen that an increase in speed of the motor 1 will be reflected in an increase in the output voltage of generator 2. As long as the motor has not reached the predetermined speed desired, tube 9 will not fire, and speed control field 7 will remain unenergized. When the desired speed is obtained, tube 9 will fire, causing control field 7 to be energized by the difference between the counterconductive voltage of the tube and the voltage of generator 2, thus reducing the speed of the motor due to the increased excitation flux. Thereafter increases in speed will be reflected in greater excitation flux which will reduce the speed, and conversely, reduction in speed will reduce the current in motor field winding 7 with a corresponding reduction in excitation flux and increase in speed.

It can be seen that our construction permits rapid starting and acceleration of the motor with good speed regulation at a predetermined point, the device responding instantaneously to variations in line voltage and load.

While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States is:

1. In a regulated-speed motor system the combination of an electric motor having a field winding for controlling the speed, an auxiliary generator driven by said motor and having its armature connected to energize the field winding of said motor, and a gas-filled discharge tube having a definite discharge voltage and a constant terminal voltage after discharge and arranged in circuit between said field winding and said generator armature whereby said field winding is energized after a predetermined voltage output of said generator is obtained.

2. In a regulated-speed motor system, the combination of an electric motor having field-producing means for controlling the speed, means responsive to rotation of said motor for developing a voltage adapted to energize said field-producing means, the voltage output of said voltage-developing means having a linear relationship with the speed of said motor, and a gaseous discharge tube having a definite discharge voltage and a constant terminal voltage after discharge and arranged in series with said field-producing means and said voltage-developing means whereby the difference between the conductive voltage of said tube and the voltage produced by said voltage-developing means is impressed on said field-producing means.

3. In a regulated-speed motor system, the combination of an electric motor having field-producing means for controlling the speed, means responsive to rotation of said motor for developing a voltage adapted to energize said field-producing means, the voltage output of said voltage-developing means having a linear relationship with the speed of said motor, and a gaseous discharge tube having a definite discharge voltage and a constant terminal voltage after discharge and arranged in series with said field-producing means and said voltage-developing means whereby said tube is nonconductive at a voltage output of said voltage-producing means below that corresponding to a predetermined speed of said motor and the difference between the conductive voltage produced by said voltage-developing means is impressed on said field-producing means, said tube being of the type which has a counterconductive voltage substantially independent of current.

4. In a regulated-speed motor system, the combination of an electric motor having a field-producing means for controlling the speed, means responsive to rotation of said motor for developing a voltage adapted to energize said field-producing means, said voltage-developing means producing a voltage having a linear relationship with the speed of said motor, and a gaseous discharge tube in circuit between said field-producing means and said voltage-developing means, said tube being of the type which has a critical minimum voltage of ionization and a counterconductive voltage substantially independent of current, said voltage-developing means producing a voltage equal to the ionization voltage of said tube when said motor reaches a predetermined speed so that at speeds below said predetermined speed said tube is nonconductive and at speeds above said predetermined speeds the difference in the voltage between the generator and the counterconductive voltage of said tube is impressed on said field-producing means.

5. In a regulated-speed motor system, the combination of an electric motor having a field winding for controlling the speed, an auxiliary generator driven by said motor having its armature connected to energize said motor field winding, said generator producing a voltage having a linear relationship with the speed of said motor, and a gaseous discharge tube in circuit between said motor field and said generator, said tube being of the type which has a critical minimum voltage of ionization and a counterconductive voltage substantially independent of current, said generator producing a voltage equal to the ionization voltage of said tube when said motor reaches a predetermined speed so that at speeds below said predetermined speed said tube is nonconductive and at speeds above said predetermined speed the difference in the voltage produced by said generator and the counterconductive voltage of said tube is impressed on said motor field.

6. In combination, an electric motor having a field winding for controlling the speed, an auxiliary generator driven by said motor for energizing said motor field, voltage-dividing means connected to the armature of said generator, said generator producing a voltage having a linear relationship with the speed of said motor, and a gaseous discharge tube in circuit between said motor field and said voltage-dividing means, said tube being of the type which has a critical minimum voltage of ionization and a counterconductive voltage substantially independent of current, said generator producing a voltage equal to the ionization voltage of said tube when said motor reaches a predetermined speed so that at speeds below said predetermined speed said tube is nonconductive and at speeds above said predetermined speed the difference in voltage produced by said generator and the counterconductive voltage of said tube is impressed on said motor field.

7. In combination, an electric motor having field-producing means for controlling the speed, means responsive to rotation of said motor for developing a voltage adapted to energize said field-producing means, said voltage-developing means producing a voltage having a linear relationship with the speed of said motor, and a plurality of parallel connected gaseous discharge tubes in circuit between said field-producing means and said voltage-developing means, said tubes being of the type which have critical minimum voltage of ionization and a counterconductive voltage substantially independent of current, one of said plurality of tubes having a resistance connected in series therewith whereby said tube will fire only after the others of said plurality of tubes have failed, said voltage-developing means producing a voltage equal to the ionization voltage of said tubes when said motor reaches a predetermined speed so that at speeds below said predetermined speed said tube is nonconductive and at speeds above said predetermined speed the difference in the voltage produced by said generator and the counterconductive voltage of said tube is impressed on said field-producing means.

8. In a regulated-speed motor system, the combination of an electric motor having a field winding for controlling speed and terminals for connection to a source of line voltage, an auxiliary generator driven by said motor and having its armature connected to energize the field winding of said motor, said generator having a field winding excited by the line voltage applied to said motor, and a gas-filled discharge tube having a definite discharge voltage and a constant terminal voltage after discharge and arranged in circuit between said motor field winding and said generator armature whereby said motor field winding is energized after a predetermined voltage output of said generator is obtained.

9. In a regulated-speed motor system, the combination of an electric motor having a field winding for controlling speed and terminals for connection to a source of line voltage, an auxiliary generator driven by said motor and having its armature connected to energize the field winding of said motor, said generator having one pole of permanent magnetic material and another pole of opposite polarity of magnetic material of negligible retentivity, said generator having a field winding wound on said last-named pole, said generator field winding being excited by the line voltage applied to said motor, and a gas-filled discharge tube having a definite discharge voltage and a constant terminal voltage after discharge and arranged in circuit between said motor field winding and said generator armature whereby said motor field winding is energized after a predetermined voltage output of said generator is obtained.

10. In a regulated speed motor system the combination of an electric motor having a field winding for controlling speed and terminals for connection to a source of line voltage, an auxiliary generator driven by said motor and having its armature connected to energize the field winding of said motor, said generator having two field windings, one of said generator field windings being excited by the line voltage applied to said motor and the other being excited by said generator armature, and a gaseous discharge tube having a definite discharge voltage and a constant terminal voltage after discharge and arranged in circuit between said motor field winding and said generator armature whereby said motor field winding is energized after a predetermined voltage output of said generator is obtained.

11. In a regulated-speed motor system, the combination of an electric motor having a field winding for controlling speed and terminals for connection to a source of line voltage, an auxiliary generator driven by said motor and having its armature connected to energize the field winding of said motor, said generator having one pole of permanent magnetic material and another pole of opposite polarity of magnetic material of negligible retentivity, said generator having two field windings wound on said last-named pole, one of said generator field windings being excited by the line voltage applied to said motor and the other being excited by said generator armature, and a gaseous discharge tube having a definite discharge voltage and a constant terminal voltage after discharge and arranged in circuit between said motor field winding and said motor armature whereby said motor field winding is energized after a predetermined voltage output of said generator is obtained.

12. In a regulated-speed motor system, the combination of an electric motor having a field winding for controlling speed and terminals for connection to a source of line voltage, an auxiliary generator driven by said motor and having its armature connected to energize said motor field winding, said generator having a field winding excited by the load current of said motor, and a gas-filled discharge tube having a definite discharge voltage and a constant terminal voltage after discharge and arranged in circuit between said motor field winding and said motor armature whereby said motor field winding is energized after a predetermined voltage output of said generator is obtained.

13. In a regulated-speed motor system, the combination of an electric motor having a field winding for controlling speed and terminals for connection to a source of line voltage, an auxiliary generator driven by said motor and having its armature connected to energize said motor field winding, said generator having one pole of permanent magnetic material and another pole of opposite polarity of magnetic material of negligible retentivity, said generator having a field winding wound on said last-named pole, said generator field winding being excited by the load current of said motor, and a gaseous discharge tube having a definite discharge voltage and a constant terminal voltage after discharge and arranged in circuit between said motor field winding and said generator armature whereby said motor field winding is energized after a predetermined voltage output of said generator is obtained.

14. In a regulated-speed motor system, the combination of an electric motor having a field winding for controlling the speed and terminals for connection to a source of line voltage, an auxiliary generator driven by said motor and having its armature connected to energize said motor field, said generator having two field windings, one of said generator field windings being excited by the load current of said motor and the other being excited by the line voltage applied to said motor, and a gaseous discharge tube having a definite discharge voltage and a constant terminal voltage after discharge and arranged in circuit between said motor field winding and said generator armature whereby said motor field winding is energized after a predetermined voltage output of said generator is obtained.

15. In a regulated-speed motor system, the combination of an electric motor having a field winding for controlling speed and terminals for connection to a source of line voltage, an auxiliary generator driven by said motor and having its armature connected to energize the field winding of said motor, said generator having one pole of a permanent magnet material and another pole of opposite polarity of magnetic material of negligible retentivity, said generator having two field windings wound on said last-named pole, one of said generator field windings being excited by the load current of the motor and the other being excited by the line voltage of said generator, and a gaseous discharge tube having a definite discharge voltage and a constant terminal voltage after discharge and arranged in circuit between said motor field winding and said motor armature whereby said motor field winding is energized after a predetermined voltage output of said generator is obtained.

RAY D. JONES.
FRANK W. MERRILL.

REFERENCES CITED

The following references are of record in the file of this patent:

UNITED STATES PATENTS

| Number | Name | Date |
|---|---|---|
| 1,442,728 | Meyer | Jan. 16, 1923 |
| 1,924,364 | Koch | Aug. 29, 1933 |
| 1,972,689 | Meyer | Sept. 4, 1934 |
| 2,193,406 | Goss et al. | Mar. 12, 1940 |
| 2,308,994 | Mickey | Jan. 19, 1943 |
| 2,331,960 | Button | Oct. 19, 1943 |
| 2,407,876 | Godet | Sept. 17, 1946 |
| 2,432,302 | Fisher | Dec. 9, 1947 |

Certificate of Correction

Patent No. 2,481,311                                                September 6, 1949

RAY D. JONES ET AL.

It is hereby certified that error appears in the printed specification of the above numbered patent requiring correction as follows:

Column 6, line 62, for the word "speeds" read *speed*;

and that the said Letters Patent should be read with this correction therein that the same may conform to the record of the case in the Patent Office.

Signed and sealed this 7th day of March, A. D. 1950.

[SEAL]

THOMAS F. MURPHY,
*Assistant Commissioner of Patents.*